No. 694,610. Patented Mar. 4, 1902.
J. W. BROWN & G. ELICK.
FOUR HORSE EVENER FOR GANG PLOWS.
(Application filed Jan. 16, 1901.)
(No Model.)
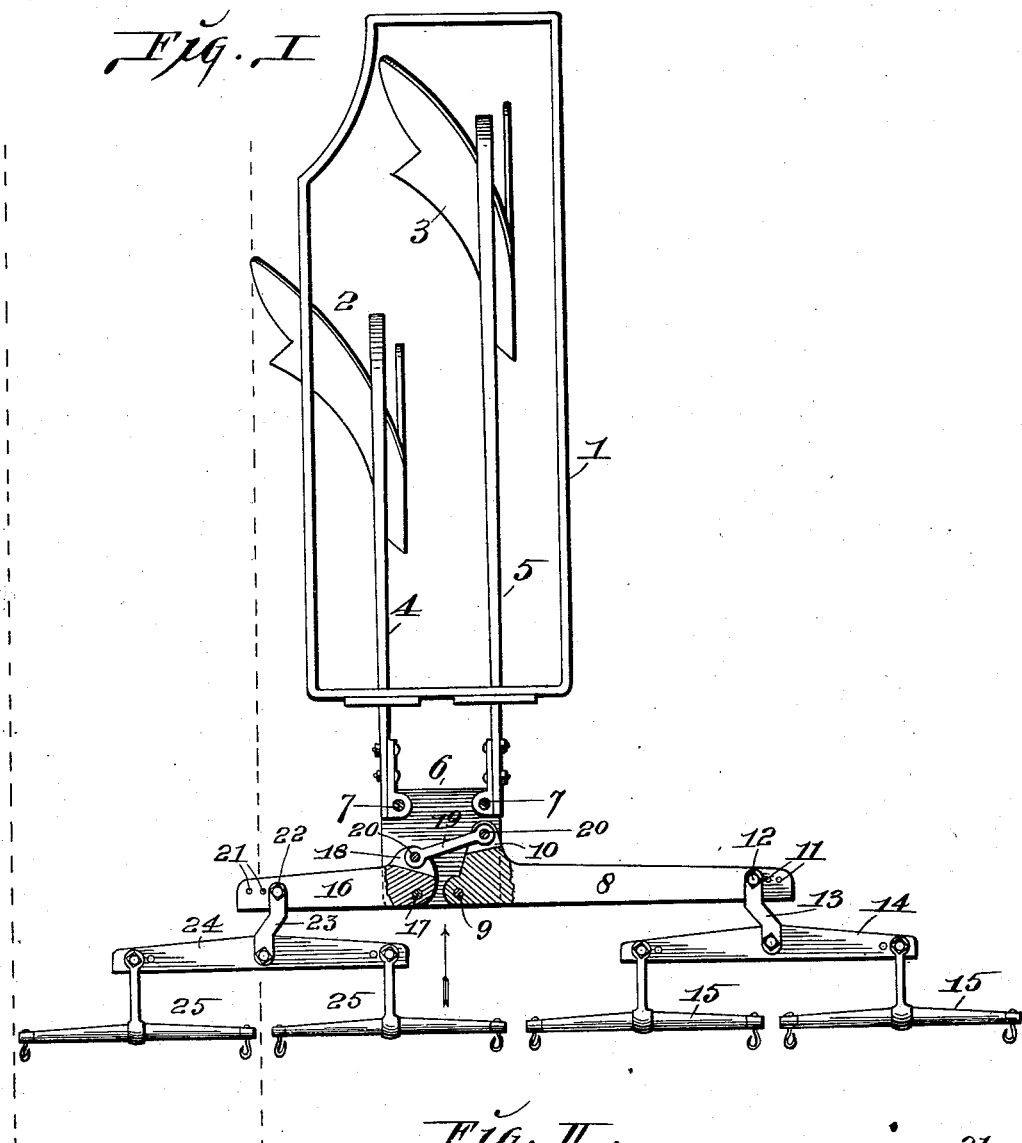
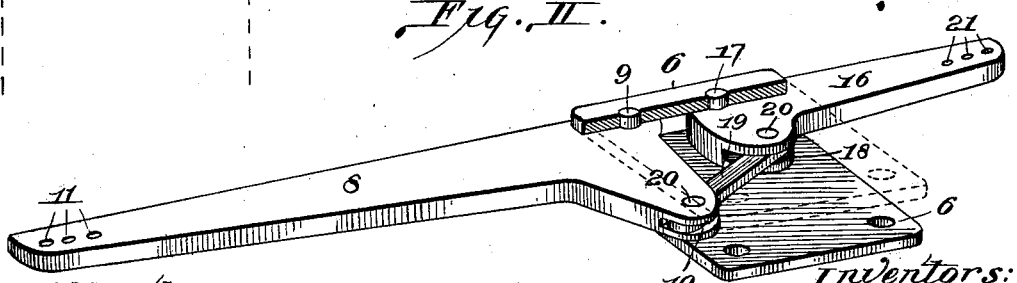
Inventors:
John W. Brown and
George Elick.

UNITED STATES PATENT OFFICE.

JOHN W. BROWN AND GEORGE ELICK, OF QUINCY, ILLINOIS, ASSIGNORS TO THE COLLINS PLOW COMPANY, OF QUINCY, ILLINOIS, A CORPORATION.

FOUR-HORSE EVENER FOR GANG-PLOWS.

SPECIFICATION forming part of Letters Patent No. 694,610, dated March 4, 1902.

Application filed January 16, 1901. Serial No. 43,498. (No model.)

*To all whom it may concern:*

Be it known that we, JOHN W. BROWN and GEORGE ELICK, citizens of the United States, residing at Quincy, in the county of Adams and State of Illinois, have invented certain new and useful Improvements in Four-Horse Eveners for Gang-Plows, of which the following is a full, clear, and exact description, reference being had to the accompanying drawings, forming part of this specification.

Our invention relates to a four-horse evener adapted for use in equalizing the draft of four horses when attached to gang-plows.

Our invention has for its object to centralize the line of draft with respect to the series of plows in gang and place said line of draft at a point to one side of a position between the two innermost of the four horses, so as to cause the proper equalization of draft in order to cause the horses to move and work in uniformity.

Gang-plows as now constructed are subject to objection by reason of a serious difficulty—viz., lack of room for the four horses attached to the plow, and especially the horse that works in the furrow, so that the horses are crowded together in working. As a rule the furrow-horse is continually crowded out of the furrow onto the plowed ground by the traces of the harness, owing to the uneven draft present. In the construction of our evener we have produced a proper arrangement and assemblage of parts that effectually overcomes the objectionable feature of such crowding of the horses.

Our invention consists in features of novelty hereinafter fully described, and pointed out in the claims.

Figure I is a plan view of our evener applied to a gang-plow, parts being broken away and shown in section. Fig. II is an enlarged detail perspective view of the two levers of the evener with the upper one of the pair of plates to which the levers are pivoted partially removed.

1 designates the frame of a gang-plow, 2 and 3 the plows, and 4 and 5 the plow-beams.

6 designates two plates, one of which surmounts the other. The plates 6 receive the pivotal connection of the plow-beams 4 and 5 by means of pins 7, that pass through the plates and clips at the forward ends of the plow-beams, as shown in Fig. I.

8 designates a long lever having the inner end thereof mounted between the plates 6 and pivotally connected to the plates near their front edges by a pivot-pin 9. The lever 8 is provided with a rearwardly-extending arm 10, to which more particular reference will be hereinafter made. In the outer end of the lever 8 are a series of holes 11, either one of which is adapted to receive a bolt 12 of a coupling 13, connected at its opposite end to a doubletree 14, that carries a pair of singletrees 15. The series of holes 11 provide for the adjustable application of the doubletree-coupling to the lever 8, according to requirement in obtaining the proper draft on said lever.

16 designates a short lever, the inner end of which is mounted between the plates 6 near their forward edges and which is pivotally connected to said plates by a pivot-pin 17, positioned approximately in line with the pivot of the long lever 8. The lever 16 is provided with a rearwardly-extending arm 18, that is of less length than the arm 10 of the long lever 8. The arms 10 and 18 of the long and short levers, respectively, are connected by a link 19, the ends of which are pivotally joined to said arms by pins 20. The outer end of the short lever 16 is provided with a series of holes 21, either of which is adapted to receive a bolt 22 of a coupling 23, that connects the doubletree 24 to the short lever 16, similar to the manner of the connection of the doubletree 14 to the long lever 8. The doubletree 24 carries singletrees 25.

In the use of our evener two horses are attached to the long lever 8 by its doubletree and singletrees, and a second pair of horses are attached to the short lever 16 by its doubletree and singletrees. The greatest leverage in the evener would naturally be contained by the long lever 8 if the two levers were of uniform dimensions at their inner ends; but in the operation of our evener constructed as described the excess of leverage in the long lever is counteracted by the varying dimensions of the arms carried by the two levers at their inner ends. It will be seen that while the lever 8 is longer than the lever 16 the arm 10 of said lever is also longer than the arm 18 of the lever 16 and that the distance between the pivot 9 of the long lever and the connection of the link 19 thereto is greater than the distance between the pivot 17 of the short lever and the connection of the link to the arm of said lever. As a consequence the increased leverage of the long lever 8 over that of the short lever 16 is overcome by the increased leverage of the arm of the short lever upon the arm of the long lever, so that the leverage is entirely balanced, and the line of draft is centralized, with respect to the plows arranged in gang, in such manner that the horses are caused to pull evenly and exert a draft that is central with relation to the plows.

The dotted lines seen in Fig. I indicate the furrow made in the operation of the plow, and in the use of our evener the furrow-horse is permitted to constantly walk in line with said furrow, there being no liability of his being crowded therefrom by reason of unequal draft.

We claim as our invention—

1. In a four-horse evener, the combination of a pair of plates separated from each other, a pair of levers independently pivotally mounted between said plates, and means of connection between said levers, substantially as described.

2. In a four-horse evener, the combination of a pair of plates separated from each other, a pair of levers independently pivotally mounted between said plates and having rearwardly-extending arms, and a connecting-link by which said arms are joined between said plates, substantially as described.

3. In a four-horse evener, the combination of a pair of plates separated from each other, a pair of levers, pivot-pins located in said plates and passing through said levers to connect them independently to said plates, rearwardly-extending forked arms carried by said levers and positioned between said plates, and a link pivotally mounted within the forks of said arms, substantially as described.

JOHN W. BROWN.
GEORGE ELICK.

In presence of—
H. D. BROWN,
L. L. KLEIN.